(12) United States Patent
Pappas et al.

(10) Patent No.: US 11,533,602 B2
(45) Date of Patent: Dec. 20, 2022

(54) DEVICE, SYSTEM AND METHOD FOR SELECTING A PUBLIC SAFETY ANSWERING POINT SERVER TO INCLUDE ON A CALL

(71) Applicant: MOTOROLA SOLUTIONS, INC., Chicago, IL (US)

(72) Inventors: Scott J. Pappas, Chicago, IL (US);
Steve Mardakis, Vancouver (CA);
Chantal Levert, Vancouver (CA);
Jeremiah J. Nelson, Chicago, IL (US);
Francois Cregheur, Vancouver (CA)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 66 days.

(21) Appl. No.: 17/316,427

(22) Filed: May 10, 2021

(65) Prior Publication Data
US 2022/0360961 A1 Nov. 10, 2022

(51) Int. Cl.
| | |
|---|---|
| *H04W 4/90* | (2018.01) |
| *H04W 64/00* | (2009.01) |
| *H04W 4/12* | (2009.01) |
| *H04W 4/029* | (2018.01) |
| *H04W 4/021* | (2018.01) |

(52) U.S. Cl.
CPC .............. *H04W 4/90* (2018.02); *H04W 4/021* (2013.01); *H04W 4/029* (2018.02); *H04W 4/12* (2013.01); *H04W 64/003* (2013.01)

(58) Field of Classification Search
CPC ....... H04W 4/021; H04W 4/029; H04W 4/21; H04W 4/90; H04W 8/10; H04W 8/12; H04W 8/14; H04W 64/003
See application file for complete search history.

(56) References Cited

U.S. PATENT DOCUMENTS

| | | | |
|---|---|---|---|
| 6,914,896 B1 * | 7/2005 | Tomalewicz | ............ H04L 41/00 370/352 |
| 8,165,560 B2 | 4/2012 | Stenquist | |
| | (Continued) | | |

OTHER PUBLICATIONS 10-21 Police Phone—Callyo—https://web.archive.org/web/20201202070326/https://callyo.com/public-safety/10-21-police-phone Published on Dec. 2, 2020.
(Continued)

*Primary Examiner* — Jean A Gelin
(74) *Attorney, Agent, or Firm* — Perry + Currier, Inc.

(57) ABSTRACT

A device, system, and method for selecting a public safety answering point server to include on a call is provided. A first communication device associated with a first responder, during a call with a second communication device, provides first and second input mechanisms to select a public-safety answering point (PSAP) to include on the call, respectively based on an association with the first communication device or based on a location of the second communication device. In response to detecting activation of the first or second input mechanism, the first communication device respectively provides, to a network server: information to identify the association with the first communication device or the location of the second communication device. Subsequently, first and second communication devices communicate on the call with a PSAP as selected by the network server.

20 Claims, 9 Drawing Sheets

(56) References Cited

U.S. PATENT DOCUMENTS

| | | | |
|---|---|---|---|
| 8,666,031 B2 | 3/2014 | Rowe et al. | |
| 8,699,672 B1* | 4/2014 | Schumacher | H04L 65/1073 |
| | | | 455/404.1 |
| 8,761,721 B2* | 6/2014 | Li | H04W 4/90 |
| | | | 455/404.1 |
| 8,868,028 B1* | 10/2014 | Kaltsukis | H04W 76/50 |
| | | | 455/404.1 |
| 8,913,981 B1* | 12/2014 | Schumacher | H04W 4/90 |
| | | | 455/67.11 |
| 9,094,535 B2* | 7/2015 | Boni | H04W 76/50 |
| 9,116,223 B1* | 8/2015 | Martin | G01S 19/17 |
| 9,237,431 B2* | 1/2016 | Wang | H04W 4/90 |
| 9,420,099 B1* | 8/2016 | Krishnan | H04W 4/90 |
| 9,485,357 B2* | 11/2016 | Fletcher | H04M 3/5116 |
| 9,860,722 B1* | 1/2018 | Ray | H04W 4/90 |
| 10,419,915 B2* | 9/2019 | Mehta | H04W 76/50 |
| 2011/0188416 A1* | 8/2011 | Faccin | H04W 76/10 |
| | | | 370/310 |
| 2014/0241334 A1* | 8/2014 | Martin | H04W 4/023 |
| | | | 370/338 |
| 2015/0111527 A1* | 4/2015 | Michaelis | H04W 24/00 |
| | | | 455/404.2 |
| 2016/0227589 A1* | 8/2016 | Marshall | H04W 4/029 |
| 2016/0379470 A1* | 12/2016 | Shurtz | H04M 3/12 |
| | | | 455/404.2 |
| 2017/0251347 A1* | 8/2017 | Mehta | H04W 4/90 |
| 2018/0302450 A1* | 10/2018 | Nimbavikar | H04W 68/00 |
| 2019/0174289 A1* | 6/2019 | Martin | H04W 4/90 |
| 2021/0120393 A1* | 4/2021 | Jensen | H04L 61/103 |
| 2021/0219257 A1* | 7/2021 | Anand | H04W 64/003 |

OTHER PUBLICATIONS

NENA i3 Standard for Next Generation 9-1-1—published Nov. 13, 2020.

* cited by examiner

DEVICE, SYSTEM AND METHOD FOR SELECTING A PUBLIC SAFETY ANSWERING POINT SERVER TO INCLUDE ON A CALL

BACKGROUND OF THE INVENTION

Communication devices of first responders may be provisioned with, and/or have access to, telephone and/or communication applications, and the like, which assists the first responders with taking and/or making calls and/or texting with communication devices of members of the community. However, including a public safety answering point (PSAP), and the like, on a call conducted via such applications may be challenging.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
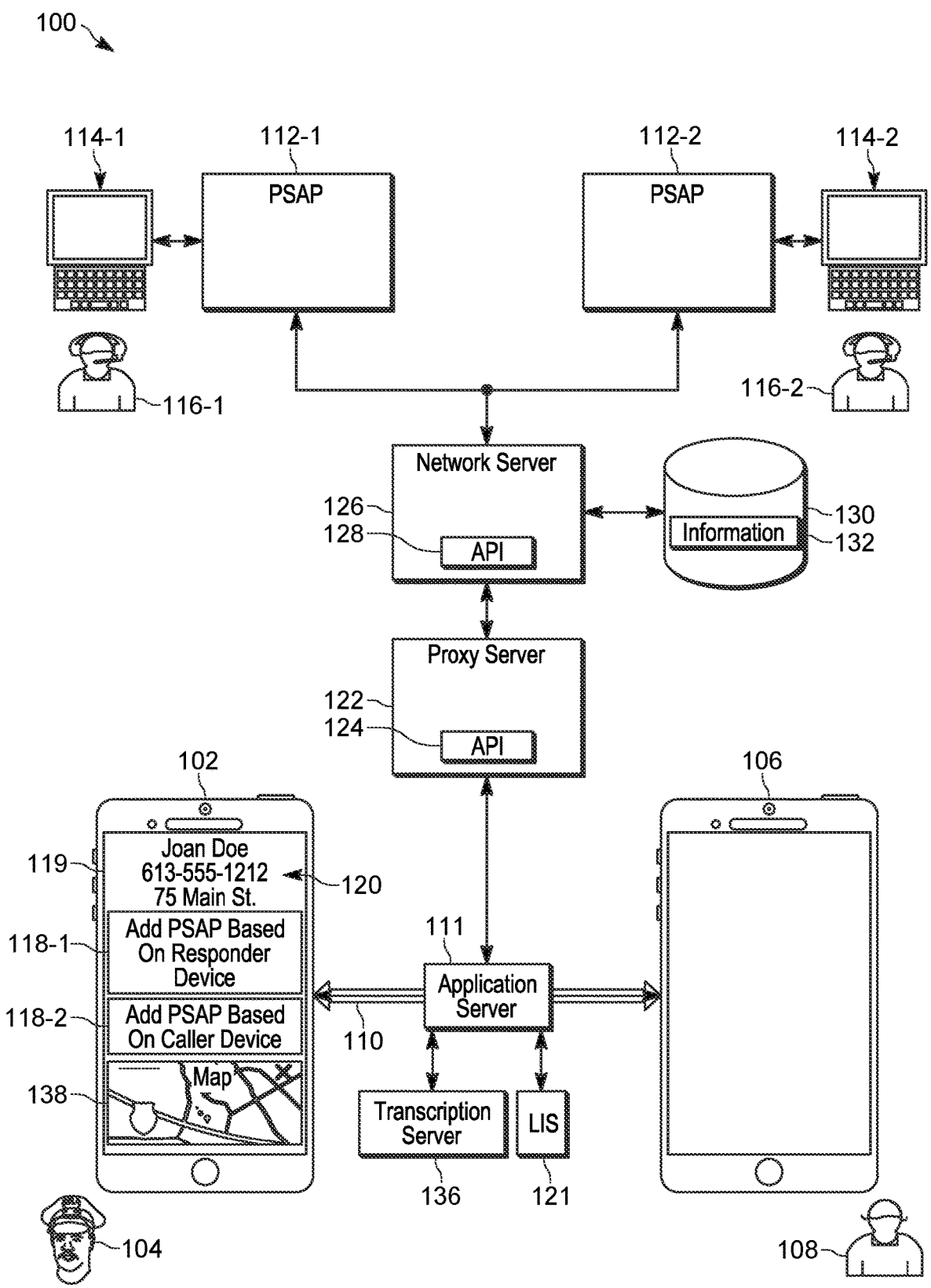
FIG. 1 is a system for selecting a public safety answering point server to include on a call, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Communication devices of first responders may be provisioned with, and/or have access to, telephone and/or communication applications, and the like, which assists the first responders with taking and/or making calls and/or texting with communication devices of members of the community. However, adding a public safety answering point (PSAP), and the like, on a call conducted via such applications can be challenging. For example, during a call, it may be determined that the call should be escalated to a dispatcher via a PSAP (e.g., associated with a 911 call center); put another way, it may be determined that the call should be escalated to an emergency call and/or a 911 call. Presently, communication applications, and the like, used by communication devices of first responders may not be equipped to handle such an escalation. For example, one way of handling such an escalation is for the call to end (e.g., all parties hang up), and a member of the community who was on the call could then call a PSAP (e.g., 911), and the like, using their communication device and conference in the communication device of the first responder who was on the call. However, such an escalation generally delays contact with a PSAP and/or a dispatcher, and the like, and further relies on the member of the community who was on the call conferencing in the communication device of the first responder who was on the call, which may lead to delays in dispatching first responders to an incident. Furthermore, such an escalation results in the communication device of the member of the community contacting a PSAP based on their location, rather than a PSAP associated with the first responder, which may lead to additional challenges in dispatching first responders to an incident and/or in communicating information about the incident to the PSAP. Thus, there exists a need for an improved technical method, device, and system for selecting a public safety answering point server to include on a call.

Hence, provided herein is a device, system, and method for selecting a public safety answering point server to include on a call. For example, at a communication device of a first responder, engaged in a call with a communication device of member of the community, for example using a dedicated first responder communication application (e.g., which may be located at the communication device and/or implemented in conjunction with an application server), input mechanisms may be provided to select a PSAP to add (e.g., conference in) to the call based on: an association with the communication device of a first responder or based on a location of the communication device of the member of the community. Such input mechanisms may be buttons and/or electronic buttons provided at the communication device of a first responder and/or receipt of voice input.

A PSAP may be selected based on an association with the communication device of a first responder, for example when the first responder operates the communication device to activate the associated input mechanism (e.g., selecting an associated electronic button). The first responder may activate an input mechanism that causes such a PSAP to be selected in instances where an incident report associated with the call has already been initiated at such a PSAP, and/or in any other suitable situation.

Similarly, a PSAP may be selected based on a location of the communication device of the member of the community, for example when the first responder operates the communication device to activate the associated input mechanism (e.g., selecting an associated electronic button). The first responder may activate an input mechanism that causes such a PSAP to be selected in instances where such a PSAP may initiate a more effective response to an incident associated with the call, for example due to other first responders associated with such a PSAP being closer to the location of the communication device of the member of the community than first responders associated with a PSAP associated with the communication device of a first responder, and/or in any other suitable situation.

Depending on which input mechanism is activated, the communication device of the first responder provides different information to a network server which is generally enabled to select an appropriate PSAP and conference the selected PSAP into the call. For example, when the first responder operates their communication device to activate an input mechanism that causes a PSAP to be selected based on an association with the communication device of a first responder, the communication device of the first responder provides information to the network server that identifies the association with the first communication device, such as one or more of: a network address of an associated PSAP and/or any other suitable identifier thereof; an associated agency identifier; a badge number of the first responder, and/or the like. In these examples, the network server selects the associated PSAP of the first responder and conferences in the PSAP accordingly, for example by connecting and/or conferencing, and the like, a communication device of a dispatcher associated with the PSAP into the call.

Alternatively, when the first responder operates their communication device to activate an input mechanism that causes a PSAP to be selected based on the location of the communication device of the member of the community, the communication device of the first responder provides the location (i.e. of the communication device of the member of the community) to the network server. In these examples, the network server selects a PSAP that services the location of the communication device of the member of the community and conferences in the PSAP accordingly, for example by connecting and/or conferencing, and the like, a communication device of a dispatcher associated with the PSAP into the call.

It is understood that communication between the communication device of the first responder and the network server may occur via a proxy server and/or an Application Programming Interface (API) at the proxy server and/or the network server. Furthermore, an Application server may be used to facilitate communication between the communication devices of the first responder and the member of the community, as well as facilitate communication with the proxy server and/or the network server.

An aspect of the specification provides a method comprising: receiving, at a first communication device associated with a first responder, during a call with a second communication device, input to include a public-safety answering point (PSAP) on the call, the PSAP to be selected by a network server; responsive to receiving the input, providing, at the first communication device: a first input mechanism to select the PSAP based on an association with the first communication device; and a second input mechanism to select the PSAP based on a location of the second communication device; in response to detecting activation of the first input mechanism providing, from the first communication device to the network server: information to identify the association with the first communication device; in response to detecting activation of the second input mechanism, providing, from the first communication device to the network server: the location of the second communication device; and, subsequently, communicating on the call, at the first communication device, with the second communication device and the PSAP as selected by the network server.

Another aspect of the specification provides a communication device associated with a first responder, the communication device comprising: a communication unit; and a controller configured to: receive, during a call with a second communication device, input to include a public-safety answering point (PSAP) on the call, the PSAP to be selected by a network server; responsive to receiving the input, provide: a first input mechanism to select the PSAP based on an association with the communication device; and a second input mechanism to select the PSAP based on a location of the second communication device; in response to detecting activation of the first input mechanism provide, via the communication unit, from the controller to the network server: information to identify the association with the communication device; in response to detecting activation of the second input mechanism, provide, via the communication unit, from the controller to the network server: the location of the second communication device; and, subsequently, communicate on the call, via the communication unit, with the second communication device and the PSAP as selected by the network server.

Each of the above-mentioned aspects will be discussed in more detail below, starting with example system and device architectures of the system in which the embodiments may be practiced, followed by an illustration of processing blocks for achieving an improved technical method, device, and system for selecting a public safety answering point server to include on a call.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for selecting a public safety answering point server to include on a call. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

The system 100 comprises a first communication device 102 associated with a first responder 104, and a second communication device 106 associated, for example, by a member of the community and/or the general public, and the like, referred to hereafter as a user 108. While the user 108 is presently described as a member of the community and/or the general public, the user 108 may be any suitable user of the second communication device 106.

Furthermore, while the first communication device 102 is depicted as a mobile device, the first communication device 102 may be in any suitable format including, but not limited to, a vehicle communication device, a laptop computer, a fixed location communication device (e.g., a desktop phone), and the like. Similarly, while the second communication device 106 is depicted as a mobile device, the second communication device 106 may be in any suitable format which may be the same as, or different from, the format of the first communication device 102.

As depicted, the communication devices 102, 106 are engaged in a call 110, for example via an application server 111. Such initiation of the call 110 may occur when the first responder 104 operates the first communication device 102 to call the second communication device 106. In particular, the first responder 104 may operate the first communication device 102 to call the second communication device 106 using a first-responder specific communication application that has been provisioned at the first communication device 102; alternatively, functionality of such a first-responder specific communication application may be distributed between the first communication device 102 and the application server 111. Such a first-responder specific communication application may have other functionality, as described in more detail below, that may generally enable the first communication device 102 to acquire information about the call 110 and/or associated with the call 110, and/or may combine different communication functionalities (e.g., calling and texting) that may not otherwise be available with commercial communication applications. Regardless, such a first-responder specific communication application may initiate the call 110 which may occur via the application server 111; however, in other examples, the application server 111 may be optional. When present, the application server 111 may generally be operated by an agency, such as a police department and the like, with which the first responder 104 is a member. Hereafter, while references may be made to the first communication device 102 initiating the call 110 with the second communication device 106, or vice versa, it is understood that such an initiation may occur via the application server 111. Indeed, the application server 111 may implement any suitable functionality of a first-responder specific communication application as described herein.

Alternatively, the user 108 may operate the second communication device 106 to call 110 the first communication device 102 (e.g., which may occur via the application server 111). However, the call 110 may be initiated in any suitable manner.

As depicted, the call 110 is depicted as a large arrow on communication links between the communication devices 102, 106 (e.g., via the application server 111) indicating that the call 110 is generally occurring on the communication link and being implemented using any suitable network equipment, and the like. Furthermore, the call 110 may comprise one or more of a cell phone call, an Internet Protocol (IP) and/or a Voice Over IP (VOIP) call, a Public Switched Telephone Network (PSTN) call, which may depend on the format of one or more of the communication devices 102, 106. Furthermore, while the call 110 is described herein with respect to a phone call, and the like, the call 110 may include and/or any other suitable type of call including, but not limited to multimedia calls (e.g., calls that include text, video, and the like).

As depicted, the system further comprises a first PSAP 112-1 and a second PSAP 112-2. The PSAPs 112-1, 112-2 are interchangeably referred to hereafter, collectively, as the PSAPs 112 and, generically, as a PSAP 112. This convention will be used elsewhere in the present specification.

A PSAP 112 may comprise any suitable combination of call handling equipment, call servers, and the like (e.g. call handling equipment may include call servers, and the like). In particular, a PSAP 112 may direct calls to any suitable PSAP terminal 114, and the like, in communication with a PSAP 112, operated, for example, by a call-taker 116 and/or a dispatcher, and the like. For example, as depicted, the first PSAP 112-1 is in communication with a first PSAP terminal 114-1 operated, for example, by a first call-taker 116-1, and the second PSAP 112-2 is in communication with a second PSAP terminal 114-2 operated, for example, by a second call-taker 116-2. The PSAP terminals 114 may include, but are not limited to, display screens, input devices such as keyboards, pointing devices and the like, and/or any combination of components that enable a respective call-taker 116 to communicate on a call. While only one PSAP terminal 114 is depicted as being in communication with each PSAP 112, a PSAP 112 may be in communication with tens to hundreds of PSAP terminals 114, and/or any suitable number of PSAP terminals 114, which may be local to, and/or remote from, a respective PSAP 112.

As depicted, it is assumed that the first PSAP 112-1 is associated with the first communication device 102. For example, the first PSAP 112-1 may be operated by, and/or associated with, an agency of which of the first responder 104 is a member and/or an employee. In a particular example, the first responder 104 may be a police officer of a police department associated with the first PSAP 112-1 such that incidents reported by calls to the first PSAP 112-1 are generally handled by the police department. While such examples assume that the first responder 104 is a police officer of a police department, the first responder 104 may be any suitable first responder associated with any suitable agency, including, but not limited to, a firefighter associated with a fire department (e.g., a fire agency), an emergency medical technician (EMT) associated with an emergency medical services agency and/or hospital agency and the like. In general, an agency of which the first responder 104 is a member may service a first given geographic area, which is also serviced by the first PSAP 112-1; put another way, first responders associated with an agency that is also associated with the first PSAP 112-1 may be dispatched (e.g., by the call-taker 116-1) to incidents within the first given geographic area.

In particular, in some examples, the first responder 104 may operate the first communication device 102 to call the second communication device 106 in conjunction with an on-going incident, for example for which an incident report (not depicted) may already exist at the first PSAP 112-1. For example, the user 108 may be a witness to the incident and the first responder 104 may operate the first communication device 102 to call the user 108 at the second communication device 106 as a follow up to investigating the incident.

Conversely, it is assumed that the second PSAP 112-2 services a second geographic area that includes the location of the communication device 106 and/or the user 108. For example, the second PSAP 112-2 may be operated by, and/or associated with, an agency that services the second geographic area that includes the location of the communication device 106.

In particular, in some examples, the first responder 104 may operate the first communication device 102 to call the second communication device 106 as a follow-up to a call the user 108 may have previously made to the first PSAP 112-1, and/or an agency of which the first responder 104 is a member, for example, when the user 108 was in the first geographic area associated with the first PSAP 112-1. However, when the first responder 104 operates the first communication device 102 to call the second communication device 106, the user 108 may be in the second geographic area serviced by the second PSAP 112-2.

As such, in some examples, on the call 110, the first responder 104 may determine that a PSAP 112 (e.g., and specifically a PSAP terminal 114 thereof) should be conferenced into, and/or added to, the call 110 for example to escalate the call 110 to an emergency call and/or a 911 call and the like. However, in some examples, the PSAP 112-1 may be added, while, in other examples, the PSAP 112-2 may be added.

As such, as depicted in FIG. 1, to enable selection of a PSAP 112 to add to the call 110, the first communication device 102 is provided with: a first input mechanism 118-1 to select a PSAP 112 to add the call 110 based on an association with the first communication device 102; and a second input mechanism 118-2 to select a PSAP 112 to add the call 110 based on a location of the second communication device 106. As depicted, the input mechanisms 118-1, 118-2 (e.g., the input mechanisms 118) are provided in the form of electronic buttons at a display screen 119 of the first communication device 102, for example in a Graphic User Interface (GUI) 120 of a communication application executed at the first communication device 102 which may also be used to initiate the call 110. However, the input mechanisms 118 may be provided in any suitable format including, but not limited to, physical buttons at the first communication device 102 (e.g., at least temporarily assigned functionality as described herein, for example during execution of the communication application at the first communication device 102), voice inputs received via a microphone of the first communication device 102 and/or any other suitable format.

In particular, in the depicted example, an input mechanism 118 may be selected by the first responder 104 operating an input device at the first communication device 102, such as a touch screen of the display screen (e.g., to touch an input mechanism 118, and the like), a pointing device, and/or in any other suitable manner.

It is understood that the view of the GUI 120 depicted in FIG. 1 further includes a name (e.g., "Joan Doe") of the user 108, a phone number (e.g., "613-555-1212") of the second communication device 106 that may have been used to initiate the call 110, and a location (e.g., "25 Main St.") of the second communication device 106, and/or the user 108, in the form a street address. However, the location of the second communication device 106 may be in any other suitable format including, but not limited to longitude and latitude of the second communication device 106, and the like. In some examples, a street address of the second communication device 106 may be provided and the first communication device may perform a lookup of the longitude and latitude via a Geographic Information Services (GIS) server (not depicted), or vice versa.

Alternatively, the first communication device 102 may provide the street address (or the longitude and latitude) of the second communication device 106 to the application server 111, which may look up the longitude and latitude (or the street address) of the second communication device 106 at a GIS server on behalf of the first communication device 102. Indeed, such an example shows that information provided at the GUI 120 may be provided from the first communication device 102 to the application server 111, which may perform any suitable functionality on behalf of the first communication device 102. Similarly, such an example further shows that the GUI 120 may provide an interface for communications between the first communication device 102 and the application server 111.

In particular, the view of the GUI 120 depicted in FIG. 1 may be understood to be one of a series of views of the GUI 120 that may be used by the communication application to one or more of initiate the call 110, transmit texts and/or messages to the second communication device 106, receive texts and/or messages from the second communication device 106 (e.g., which may include the location of the second communication device 106, enter the location of the second communication device 106 via an input device of the first communication device 102, receive the location of the second communication device 106 from a location information server, provide an initial input mechanism to receive input to initiate the view shown in FIG. 1, and the like. A portion of such views are described in more detail below with respect to FIG. 4, FIG. 5, FIG. 6, FIG. 7, FIG. 8 and FIG. 9.

Regardless, hereafter it is understood that the first communication device 102 has determined the location of the second communication device 106 from one or more of

- Receiving the location from the second communication device 106 (e.g., via the application server 111). For example, the user 108 may mention their location on the call 110 which may be detected by the first communication device 102 (e.g., using a speech-to-text engine and/or application at the first communication device 102), and/or the second communication device 106 may include a location determining device, such as a Global Positioning System (GPS) device, and the like, and may transmit the location of the second communication device 106 as metadata on the call 110.
- Receiving the location from the second communication device 106 device via a text message (e.g., via the application server 111). For example, the communication application, of which the GUI 120 is but one example, may include a view for exchanging text messages with the second communication device 106, and the user 108 of the second communication device 106 may send the location of the second communication device 106 as text which may be detected by the first communication device 102.
- Receiving the location via an input device of the first communication device 102. For example, the first responder 104 may verbally ask the user 108 their location on the call 110, and the user 108 may verbally provide their location on the call 110. Once the first responder 104 has verbally received the location, the first responder 104 may enter the location into a field provided in a view of the GUI 120.
- Receiving the location from a location information server (LIS) 121 (e.g., via the application server 111). For example, as depicted, the LIS 121 may be in communication with the application server 111, and the LIS 121 may determine the location of the second communication device 106 and provide the location of the second communication device 106 to the application server 111 which may provide the location to the first communication device 102. Alternatively, the LIS 121 may bypass the application server 111 and provide the location of the second communication device 106 to the first communication device 102.
- Any other suitable manner of determining the location of the second communication device 106.

Furthermore, hereafter, it is understood that the first communication device 102 further has access to information that identifies an association between the first communication device 102 and the first PSAP 112-1. For example, such information may be provisioned at a memory of the first communication device 102 and/or may be determined by the first communication device 102 in any suitable manner. Such information may include, but it not limited to, one or more of:

- A respective location of the first communications device 102. For example, the first communication device 102 may include a location determining device, such as a GPS device, and the like, and may determine the location of the first communication device 102, which may be in a geographic region serviced by the PSAP 112-1.
- An identifier of the PSAP 112-1 associated with one or more of the first communication device 102 or an agency associated with the first communication device 102. For example, such an identifier of the PSAP 112-1 may include a network address of the PSAP 112-1 which has been provisioned at a memory of the first communication device 102.
- An identifier of an agency associated with the first communication device 102 and/or the PSAP 112-1. Such an identifier may include an alphanumeric identifier and/or a natural language identifier (e.g., a name of the agency), which has been provisioned at a memory of the first communication device 102.
- An identifier associated with the first communication device 102 and/or the first responder 104. Such an identifier may include network address of the first communication device 102, and/or an alphanumeric identifier and/or a natural language identifier (e.g., a badge number of the first responder 104 and/or a name of the first responder 104), which has been provisioned at a memory of the first communication device 102.

As depicted, the system 100 further comprises a proxy server 122 that may include an applications programming interface (API) 124, described in more detail below.

As depicted, the system 100 further comprises a network server 126 that may also include a respective API 128, described in more detail below.

In general, the first communications device 102 may be in communication with the proxy server 122, for example, as depicted, via the application server 111. Hereafter, it is understood that communication between the first communications device 102 and the proxy server 122 may generally occur via the application server 111. The proxy server 122 may receive information from the first communications device 102 via the API 124 (e.g., and via the application server 111), and transmit the information to the network server 126 via the respective API 128. Furthermore, as will be described in more detail below, the network server 126 may be in communication with the PSAPs 112 and furthermore, the network server 126 is generally understood to select one of the PSAPs 112 to connect to and/or add to, and/or conference into, the call 110, based on the information received from the first communications device 102. Hereafter, the terms connect to and/or add to, and/or conference into the call 110, and the like, are used interchangeably.

Furthermore, a selected PSAP 112 may be connected (and the like) to the call 110 via the proxy server 122 which generally acts as a proxy for the selected PSAP 112 on the call 110.

For example, as depicted, the network server 126 has access to a memory 130 (e.g., as depicted in the form of a database) which stores information 132 that enables the network server 126 to select a PSAP 112 based on the information received from the first communication device 102. In some examples, the information 132 may include associations between the PSAPs 112 and identifiers respective agencies and/or first responders. In other examples, information 132 may include associations between the PSAPs 112 and respective geographic areas serviced the PSAPs 112.

Actions taken by the first communication device 102 when a particular input mechanism 118 is selected are next described.

For example, in response to detecting activation of the first input mechanism 118-1, the first communication device 102 may provide, to the network server 126 (e.g., via the proxy server 122) information to identify the association with the first communication device 102 with the first PSAP 112-1. Such information is understood to be formatted according to a format associated with the API 124 and/or the API 128 (e.g., which may be a same or different format). As such, the network server 126, upon receiving the information to identify the association with the first communication device 102 with the first PSAP 112-1, compares such information to the information 132 and selects the first PSAP 112-1 to connect and/or add to the call 110. The network server 126 may then control call handling components in communication networks between the communication devices 102, 106, the proxy server 122 and/or the PSAPs 112 to connect the first PSAP 112-1 to the call 110; in particular, the first PSAP 112-1 may be connected to the call 110 via the proxy server 122.

Similarly, in response to detecting activation of the second input mechanism 118-2, the first communication device 102 may provide, to the network server 126 (e.g., via the proxy server 122) the location of the second communication device 106. Such information is understood to be formatted according to a format associated with the API 124 and/or the API 128. As such, the network server 126, upon receiving the location of the second communication device 106, compares the location of the second communication device 106 to the information 132 and selects the second PSAP 112-2 to connect and/or add to the call 110, for example assuming that the location of the second communication device 106 is within the geographic area serviced by the second PSAP 112-2 as indicated by the information 132. The network server 126 may then control call handling components in communication networks between the communication devices 102, 106, the proxy server 122 and/or the PSAPs 112 to connect the second PSAP 112-2 to the call 110; in particular, the second PSAP 112-2 may be connected to the call 110 via the proxy server 122.

In each of these examples, other information may be provided to the proxy server 122 from the first communication device 102. For example, in response to detecting activation of the first input mechanism 118-1, the first communication device 102 may also provide, to the network server 126, the location of the second communication device 106 along with the information to identify the association with the first communication device 102 with the first PSAP 112-1; in this example, the information to identify the association with the first communication device 102 with the first PSAP 112-1 is understood to be the primary information that the network server 126 is to use to select the first PSAP 112-1 as the PSAP 112 to add to the call 110. For example, the information to identify the association with the first communication device 102 with the first PSAP 112-1 may be provided in a format compatible with the API 124 and/or the API 128 that indicates that such information to identify the association with the first communication device 102 with the first PSAP 112-1 is primary information, while the location of the second communication device 106 may be also be provided in a format compatible with the API 124 and/or the API 128 that indicates that the location of the second communication device 106 is secondary information (e.g., not used to select a PSAP 112).

However, yet further information may be provided to the proxy server 122 from the first communication device 102. For example, in response to detecting activation of the second input mechanism 118-2, the first communication device 102 may also provide the location of the first communication device 102 with the location of the second communication device 106.

In yet further examples, in conjunction with detecting activation of the first input mechanism 118-1 or the second input mechanism 118-2 and/or, once a selected PSAP 112 is connected to the call 110, the first communication device 102 may provide to, the selected PSAP 112, any other suitable information. Such suitable information may include, but is not limited to, a transcript of the call 110 (which may be generated by an optional transcript server 136 which may monitor the call 110 via the application server 111, and provide a transcript thereof to the first communication device 102. Other such suitable information may include, but is not limited to, photos, video, and/or audio, text files, and the like, that may be available to the first communication device 102 (e.g., as stored at a memory thereof and/or as received from the second communication device 106). In some examples, the first communication device 102 may further provide the phone number of the second communication device 106 to the selected PSAP 112.

Other features are within the scope of present examples. In particular, the GUI 120, as depicted in FIG. 1, may include a map 138 that includes the location of the communication devices 102, 106 (e.g., as respectively represented by a badge and an "X"). Hence, while not depicted, it is understood that the first communication device 102 may have access to a mapping application and/or a mapping server which may provide maps for use by the first communication device 102 including, but not limited to, the map 138.

It is furthermore understood that the components of the system 100 are but one example of how functionality of the system 100 may be implemented. For example, while as depicted the network server 126 is in communication with the PSAPs 112 and the proxy server 122, in other examples the network server 126 may be in communication with the proxy server 122 but not the PSAPs 112; rather, in these examples, the network server 126 may control call handling components in communication networks between the communication devices 102, 106, the proxy server 122 and/or the PSAPs 112 to connect a PSAP 112 to the call 110 but without otherwise being in communication with the PSAPs 112. Furthermore, as previously indicated, the application server 111 may be optional.

Figure 2:
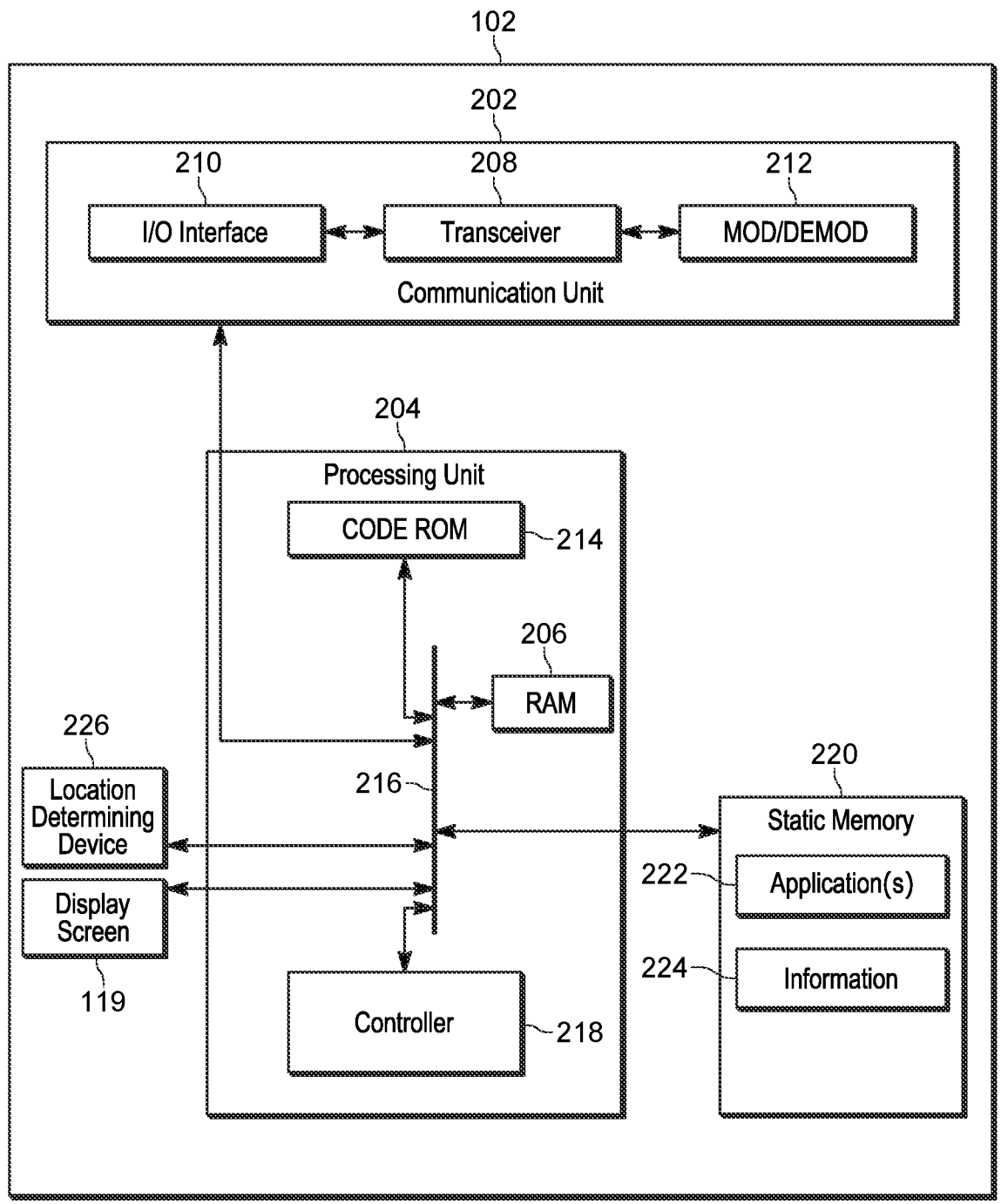
FIG. 2 is a device diagram showing a device structure of communication device for selecting a public safety answering point server to include on a call, in accordance with some examples.

Attention is next directed to FIG. 2, which depicts a schematic block diagram of an example of the first communication device 102. While the first communication device 102 is depicted in FIG. 2 as a single component, functionality of the first communication device 102 may be distributed among a plurality of components; for example, a portion of the functionality of the first communication device 102 may be implemented at the application server 111.

As depicted, the first communication device 102 comprises: a communication unit 202, a processing unit 204, a Random-Access Memory (RAM) 206, one or more wireless transceivers 208 (e.g., which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. The controller 218 is understood to be communicatively connected to other components of the first communication device 102 via the common data and address bus 216. Hereafter, the at least one application 222 will be interchangeably referred to as the application 222. In particular, the application 222 may comprise a first-responder specific communication application as described above, which causes the first communication device 102 to provide the associated GUI 120 when executed by the controller 218.

Furthermore, while the memories 206, 214 are depicted as having a particular structure and/or configuration, (e.g., separate RAM 206 and ROM 214), memory of the first communication device 102 may have any suitable structure and/or configuration.

While not depicted, the first communication device 102 may include one or an input device, such as a touch screen of the display screen 119, which is also understood to be communicatively coupled to the communication unit.

As shown in FIG. 2, the first communication device 102 includes the communication unit 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may include one or more wired and/or wireless input/output (I/O) interfaces 210 that are configurable to communicate with other components of the system 100. For example, the communication unit 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3$^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the first communication device 102 is not a generic controller and/or a generic device, but a device specifically configured to implement functionality for selecting a public safety answering point server to include on a call. For example, in some examples, the first communication device 102 and/or the controller 218 specifically comprises a computer executable engine configured to implement functionality for selecting a public safety answering point server to include on a call.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the first communication device 102 as described herein are maintained, persistently, at the memory 220 and used by the controller 218, which makes appropriate utilization of volatile storage during the execution of such programming instructions.

As depicted, the memory 220 further stored provisioned information 224 to identify an association between the first communication device 102 and the first PSAP 112-1, as described above.

Figure 3:
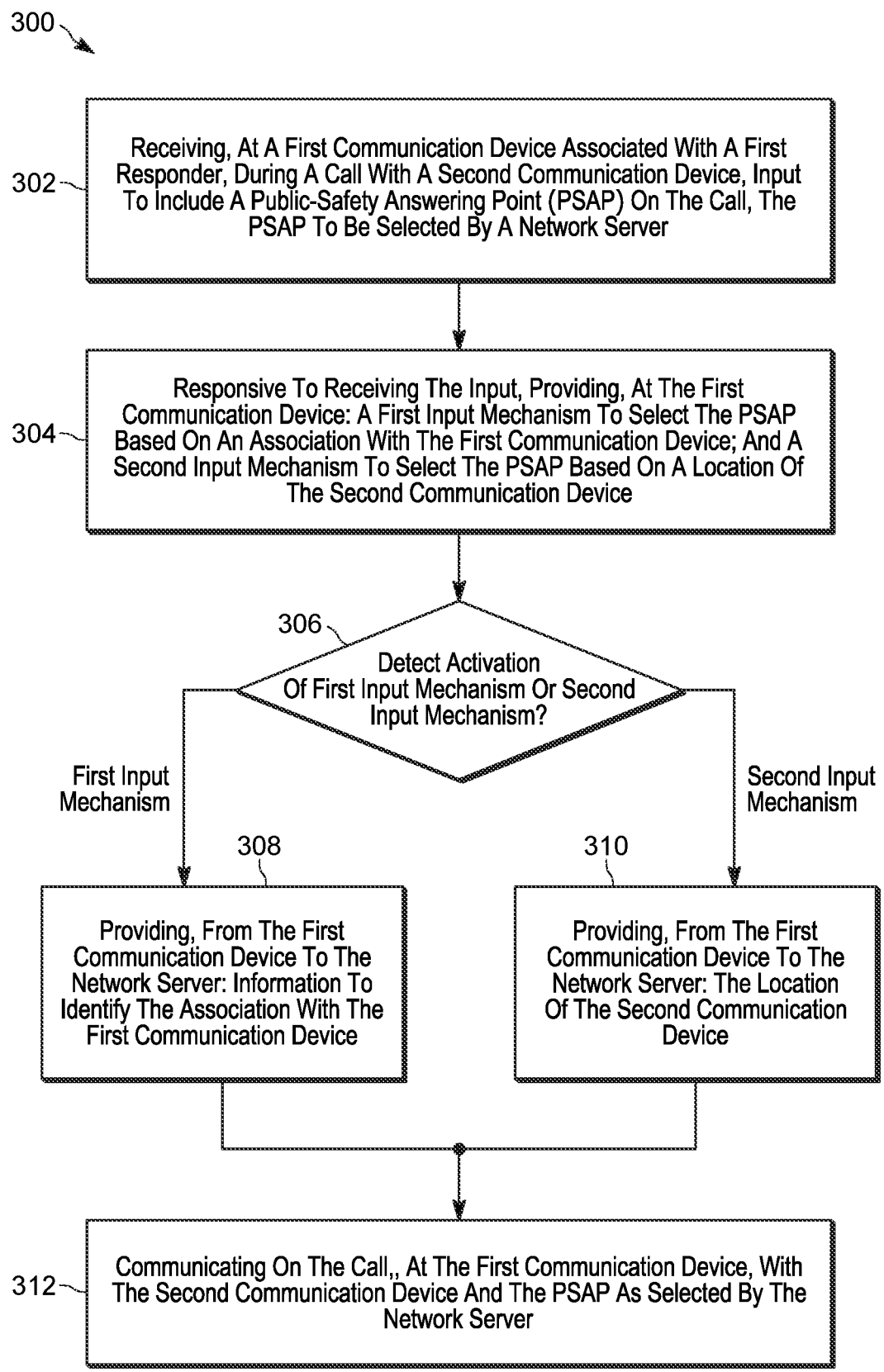
FIG. 3 is a flowchart of a method for selecting a public safety answering point server to include on a call, in accordance with some examples.

Furthermore, the memory 220 stores instructions corresponding to the at least one application 222 that, when executed by the controller 218, enables the controller 218 to implement functionality for selecting a public safety answering point server to include on a call, including but not limited to, the blocks of the method set forth in FIG. 3.

In illustrated examples, when the controller 218 executes the one or more applications 222, the controller 218 is enabled to: receive, during a call with a second communication device, input to include a public-safety answering point (PSAP) on the call, the PSAP to be selected by a network server; responsive to receiving the input, provide: a first input mechanism to select the PSAP based on an association with the first communication device; and a second input mechanism to select the PSAP based on a location of the second communication device; in response to detecting activation of the first input mechanism provide to the network server: information to identify the association with the first communication device; in response to detecting activation of the second input mechanism, provide, to the network server: the location of the second communication device; and, subsequently, communicate with the second communication device and the PSAP as selected by the network server.

Other features and/or components of the first communication device 102 are within the scope of the present specification. For example, as depicted, the controller 218 may be communicatively coupled to a location determining device 226, such as a GPS device, and the like, which enables the first communication device 102 to determine a respective location of the first communication device 102.

While details of the second communication device 106, the PSAPs 112, the PSAP terminals 114, and the servers 111, 121, 122, 126, 136 are not depicted, the second communication device 106, the PSAPs 112, the PSAP terminals 114, and the servers 111, 121, 122, 126, 136 may have components similar to the first communication device 102 adapted, however, for the respective functionality thereof.

Furthermore, the PSAPs 112 and/or one or more of the servers 111, 121, 122, 126, 136 may comprise cloud computing devices with functionality distributed over a plurality of servers, and the like.

Attention is now directed to FIG. 3, which depicts a flowchart representative of a method 300 for selecting a public safety answering point server to include on a call. The operations of the method 300 of FIG. 3 correspond to machine readable instructions that are executed by the first communication device 102, and specifically the controller 218 of the first communication device 102. In the illustrated example, the instructions represented by the blocks of FIG. 3 are stored at the memory 220 for example, as the application 222. The method 300 of FIG. 3 is one way that the controller 218 and/or the first communication device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

It is further assumed in the following discussion that the first communication device 102 is associated with the first responder 104 and/or any other suitable first responder.

At a block 302, the controller 218 and/or the first communication device 102 receives, during the call 110 with the second communication device 106, input to include a PSAP on the call 110, the PSAP 112 to be selected by the network server 126.

For example, at the GUI 120, the controller 218 and/or the first communication device 102 may provide an initial input mechanism to receive the input to include a PSAP 112 on the call 110. Such an initial input mechanism is described in more detail with respect to FIG. 5. However, such an initial input mechanism may comprise an electronic button, and the like, provided at the GUI 120 to initiate a 911 call, and the like. Hence, the input to include a PSAP 112 on the call 110 may be received at the communication application 222 as represented by the GUI 120.

However, input to include a PSAP on the call 110 may be received in any suitable format including, but not limited to, voice commands, and the like. As will be described hereafter, however, rather than initiate a 911 call, and the like, when such an initial input mechanism is activated, the input mechanisms 118 may be provided in the GUI 120 at the display screen 119. In particular, the initial input mechanism may be provided at one view of the GUI 120 at the display screen 119 and, in response to the initial input mechanism being activated, the view of the GUI 120 shown in FIG. 1 may be provided at the display screen 119.

In particular, at a block 304, the controller 218 and/or the first communication device 102, responsive to receiving the input (e.g., at the block 302), provides, at the first communication device 102: the first input mechanism 118-1 to select a PSAP 112 based on an association with the first communication device 102; and the second input mechanism 118-2 to select a PSAP 112 based on a location of the second communication device 106.

For example, at the block 304, the input mechanisms 118 may be provided at the GUI 120, as depicted in FIG. 1. In particular, the first input mechanism 118-1 and the second input mechanism 118-2 may be provided at the communication application 222 as rendered at the display screen 119 of the first communication device 102

At a block 306, the controller 218 and/or the first communication device 102 detects whether the first input mechanism 118-1 or the second input mechanism 118-2 is activated.

At a block 308, in response to detecting activation of the first input mechanism 118-1 at the block 306, the controller 218 and/or the first communication device 102 provides, from the first communication device 102 to the network server 126: the information 224 to identify the association with the first communication device 102.

As has already been described, the information 224 to identify the association with the first communication device 102 may comprise one or more of a respective location of the first communications device 102; an identifier of a given PSAP 112 associated one or more of the first communication device 102 or an agency associated with the first communications device 102 (e.g., the given PSAP 112, such as the PSAP 112-1) to be selected as the PSAP 112 to include on the call 110); a respective identifier of one or more of the agency and/or the first communication device 102; and the like.

At a block 310, in response to detecting activation of the second input mechanism 118-2 at the block 306, the controller 218 and/or the first communication device 102 provides, from the first communication device 102 to the network server 126: the location of the second communication device 106.

As such, the method 300 may further comprise (e.g., at the block 310 and/or prior to the block 310), the controller 218 and/or the first communication device 102 determining the location of the second communication device 106. As has already been described, determining the location of the second communication device 106 may occur by one or more of: receiving the location from the second communication device 106; receiving the location from the second communication device 106 via a text message; receiving the location via an input device of the first communication device 102 (e.g., described below with respect to FIG. 4); receiving the location from a location information system; and/or in any other suitable manner. Determining the location of the second communication device 106 may generally occur, however, regardless of whether the first input mechanism 118-1 or the second input mechanism 118-2 is activated.

Similarly, the method 300 may further comprise determining the location of the first communication device 102, for example via the location determining device 226, and which may generally occur regardless of whether the first input mechanism 118-1 or the second input mechanism 118-2 is activated.

Furthermore, at the block 308 and the block 310, communication with the network server 126, by the controller 218 and/or the first communication device 102, may occur via one or more of: the proxy server 122; and/or an API 124, 128 to one or more of the proxy server 122 and/or the network server 126, as previously described. Additionally, such communication may occur via the application server 111 (e.g., when present).

At a block 312, the controller 218 and/or the first communication device 102, subsequent to the block 308 being implemented or the block 310 being implemented, communicates, on the call 110, with the second communication device 106 and the PSAP 112 as selected by the network server 126. In particular it is understood that, at the block 312, the network server 126 has received the information 224 provided at the block 308, or the location of the second communication device 106 provided at the block 310 and has both: selected a PSAP 112 accordingly; and added the selected PSAP 112 to the call 110.

Put another way, the controller 218 and/or the first communication device 102 communicating with the second communication device 106 and a PSAP 112, as selected by the network server 126, may comprise the call 110 being conferenced with the PSAP 112 as controlled by the network server 126.

The method 300 may include other features. For example, as has already been described, the controller 218 and/or the first communication device 102 may provide, to the PSAP 112 selected by the network server 126, one or more of: the location of the second communication device 106 (e.g., regardless of whether the block 308 or the block 310 is implemented); a phone number of the second communication device 106; a transcript of the call 110; files available to the controller 218 and/or the first communication device 102 (e.g., photos and/or video and/or audio and/or text files, and the like), and/or any other suitable information.

The method 300 is next described with respect to FIG. 4, FIG. 5, FIG. 6, FIG. 7, FIG. 8 and FIG. 9, which are substantially similar to FIG. 1, with like components having like numbers. It is further understood that, in FIG. 4, FIG. 5, FIG. 6, FIG. 7, FIG. 8 and FIG. 9, various views of the GUI 120 are shown in a particular order, for example relative to the view of the GUI 120 shown in FIG. 1. However, an order of the views may vary; for example, a view in FIG. 4 that includes a mechanism for determining a location of the second communication device 106 may follow a view in FIG. 5 that includes a mechanism for receiving input to include a PSAP 112 on the call. Similarly, the view in FIG. 4 that includes a mechanism for determining a location of the second communication device 106 may be provided in conjunction with either of the views in FIG. 6 and FIG. 8, which depict mechanisms for providing the information 224 or a location of the second communication device 106 to the network server 126.

Such views will be explained in more detail below, but are understood to be views that may be navigated to via a menu system (not depicted) and the like, for example by operation of an input device of the first communication device 102 by the first responder 104. While not depicted, it is further understood that an initial view of the GUI 120 may be in the form of a keypad, and the like, that the first responder 104 may use to initiate the call 110 to the second communication device 106. It is further understood that, initially, the first communication device 102 may have access to a phone number of the second communication device 106, and a name of the user 108, via receipt of a message from a communication device associated with an agency of which the first responder 104 is a member, and/or in any other suitable manner. Furthermore, the call 110 may be initiated in any suitable manner which may include the first responder 104 operating the first communication device 102 to open the communication application 222 to use the aforementioned keypad, and/or the first responder 104 operating the first communication device 102 to select the phone number as received in the aforementioned message, which may automatically cause the communication application 222 to open at the first communication device 102, and "dial" the phone number.

Figure 4:
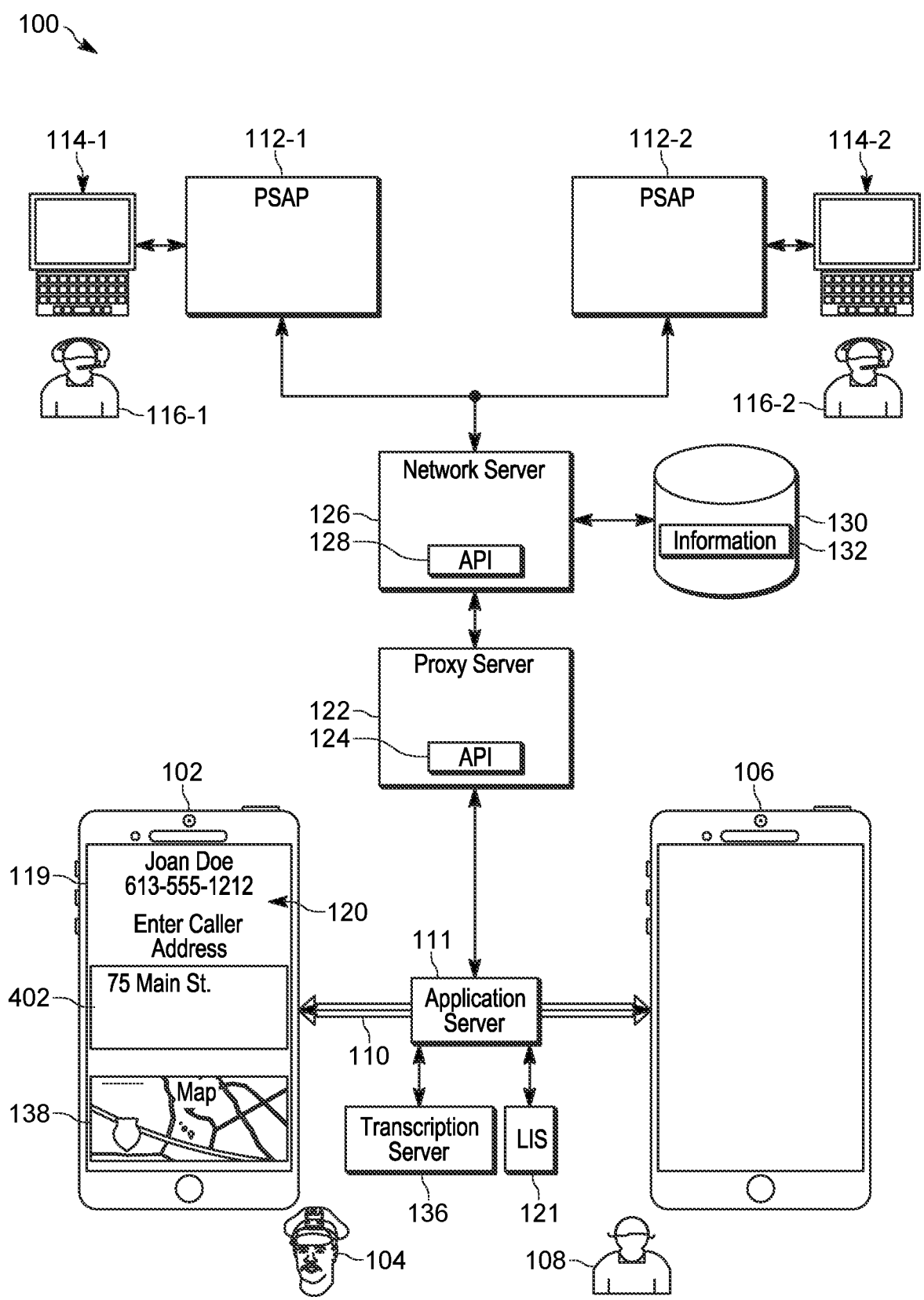
FIG. 4 depicts the system of FIG. 1, with a mechanism for determining, at a first communication device, a location of a second communication device, according to some examples.

Attention is next directed to FIG. 4, which may precede, in time, the example of FIG. 1. In FIG. 4, the location of the second communication device 106 is not initially provided at the GUI 120 as the location of the second communication device 106 is understood to have not yet been determined. Similarly, the location of the second communication device 106 is not rendered at the map 138.

However, in FIG. 4, a view of the GUI 120 is depicted which includes a field 402 for receiving the location of the second communication device 106. The first responder 104 may operate an input device (e.g., an electronic keyboard, and the like) of the first communication device 102 to enter the location of the second communication device 106 into the field 402, for example after asking the user 108 for the location of the second communication device 106 on the call 110. Hence, as depicted, the location "75 Main St." has been received at the field 402. While not depicted, the view of the GUI 120 in FIG. 4 may include an "Enter" (and the like) electronic button, and the like, to cause the location "75 Main St." received at the field 402 to be stored (e.g., at the memory 220) as the location of the second communication device 106 into the field 402.

Furthermore, in some examples, the name of the user 108 may not be initially received and another field, similar to the field 402, may be used to receive the name of the user 108.

Figure 5:
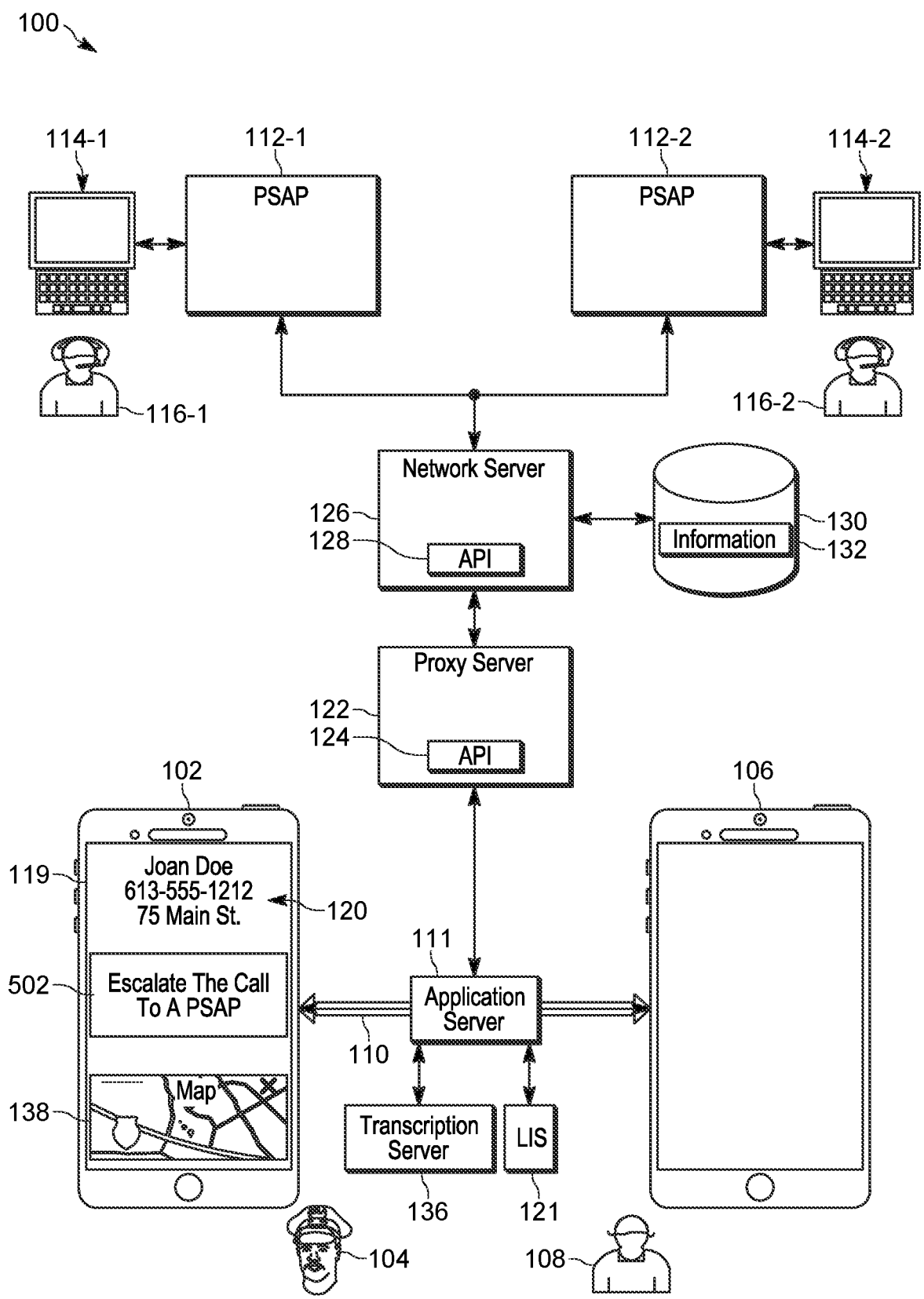
FIG. 5 depicts the system of FIG. 1, with a mechanism for receiving, at the first communication device, input to include a public-safety answering point on a call with the second communication device, according to some examples.

Attention is next directed to FIG. 5, which may follow, in time, the example of FIG. 4, and precede, in time, the example of FIG. 1. In FIG. 5, the location of the second communication device 106 is now understood to have been determined, and hence the location of the second communication device 106 is both shown in the GUI 120, and rendered at the map 138.

Furthermore, FIG. 5 provides an example of the block 302 of the method 300. In particular, the view of the GUI 120 depicted in FIG. 5 includes an initial input mechanism 502 to receive (e.g., at the block 302 of the method 300) input to include a PSAP 112 on the call 110. For example, the initial input mechanism 502 may comprise an electronic button to "Escalate The Call To A PSAP", which may be activated by the first responder 104 selecting the initial input mechanism 502, for example via a touch screen of the display screen 119.

Responsive to receiving the input to include a PSAP 112 on the call 110 (e.g., the initial input mechanism 502 being activated), the input mechanisms 118 are provided (e.g., at the block 304 of the method 300) as described above. Indeed, FIG. 1 is understood to show an example of the block 304 of the method 300. However, attention is next directed to FIG. 6 which also shows the input mechanisms 118 similar to as in FIG. 1. Hence, it is understood that the example in FIG. 6 may follow, in time, the example of FIG. 5.

Figure 6:
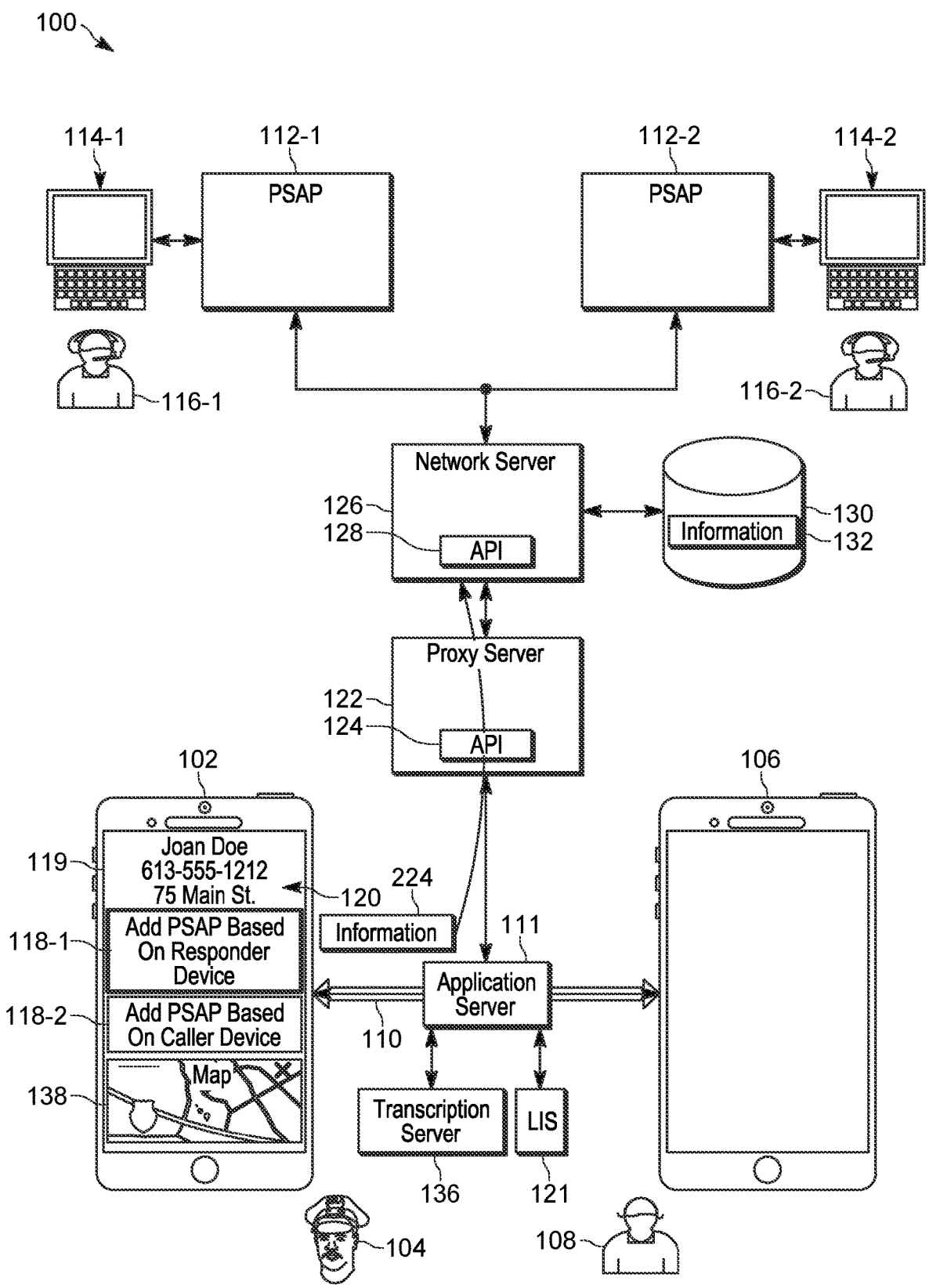
FIG. 6 depicts the system of FIG. 1, with input mechanisms to select a public-safety answering point to add to the call, provided at the first communication device, with a first input mechanism being activated to select a public-safety answering point based on an association with the first communication device, according to some examples.

However, in contrast to FIG. 1, in FIG. 6, the first communication device 102 has detected (e.g., at the block 306 of the method 300) that the first input mechanism 118-1 has been activated, as indicated by the first input mechanism 118-1 being depicted with a heavier line than the second input mechanism 118-2.

As such, in FIG. 6, the first communication device 102 provides (e.g., at the block 308 of the method 300) the information 224 to the network server 126, for example via the proxy server 122 (e.g., and the application server 111). Put another way, the first communication device 102 may transmit the information 224 to the proxy server 122, via the application server 111, which then transmits the information 224 to the network server 126. Such an example shows that the first communication device 102 may be provisioned with a network address of the proxy server 122, which is provisioned with a network address of the network server 126, but the first communication device 102 may not be provisioned with the network address of the network server 126; rather, the proxy server 122 may act as an interface, and the like, between the first communication device 102 (and/or the application server 111) and the network server 126.

In response to receiving the information 224, it is understood that the network server 126 may compare the information 224 to the information 132, and select the first PSAP 112-1 to be added to the call 110, as has previously been described.

Figure 7:
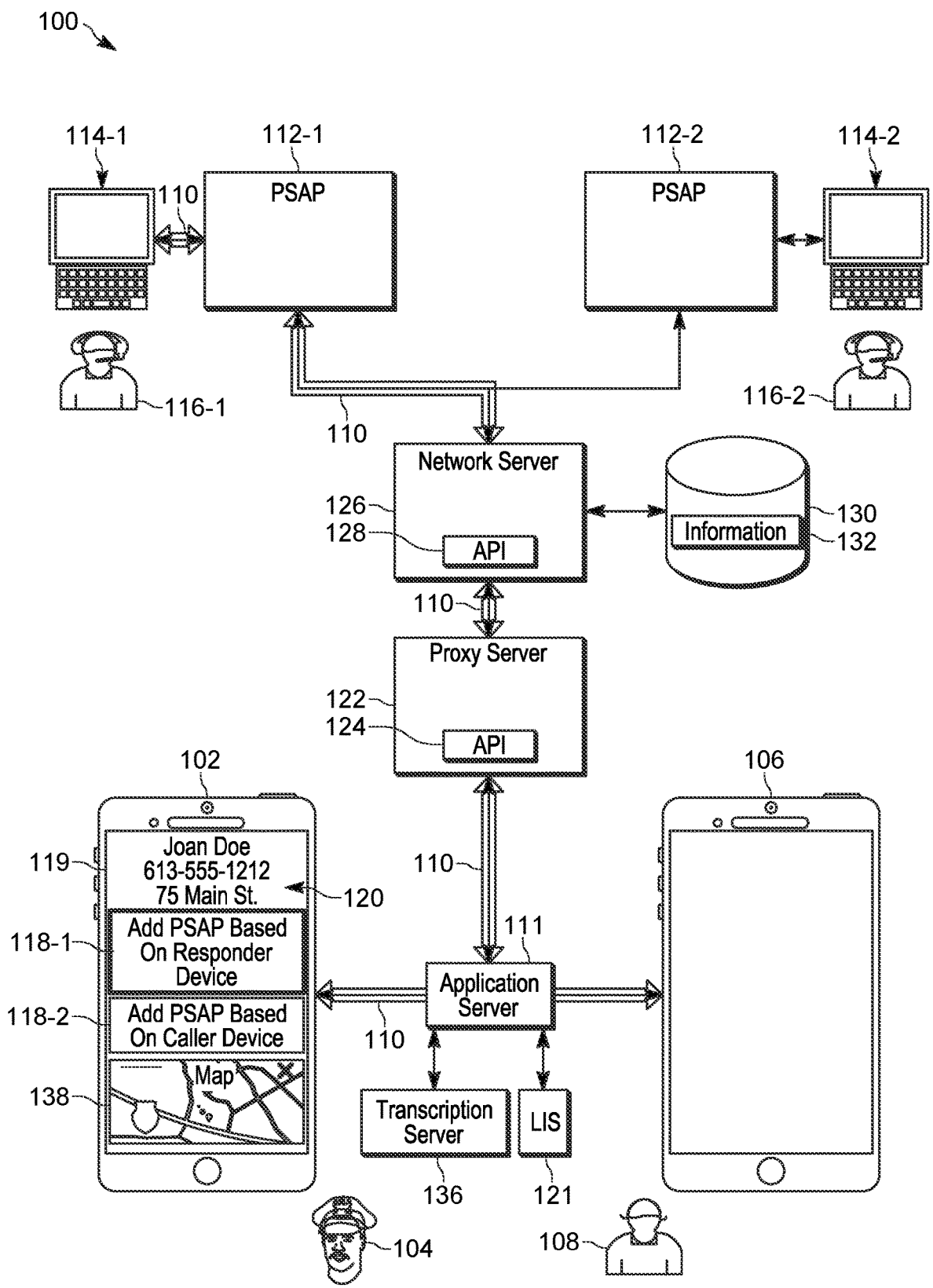
FIG. 7 depicts the system of FIG. 1, with information to identify the association with the first communication device being provided to a network server, which selects, and adds to the call, a public-safety answering point associated with the first communication device, according to some examples.

Hence, attention is next directed to FIG. 7 in which it is understood that the network server 126 has selected the first PSAP 112-1 to be added to the call 110 and further has controlled call handling components in communication networks between the communication devices 102, 106 (e.g., via the application server 111), the proxy server 122 and/or the PSAPs 112 to connect the first PSAP 112-1 to the call 110. In particular, in FIG. 7, the first PSAP terminal 114-1 is connected to the call 110 via the first PSAP 112-1, the network server 126, the proxy server 122 and the application server 111. As such, in FIG. 7, the first communication device 102 communicates (e.g., at the block 312 of the method 300) on the call 110 with the second communication device 106 and the first PSAP 112-1 as selected by the network server 126. As such, the call-taker 116-1 may talk on the call 110 with the first responder 104 and the user 108. In some examples, the first responder 104 may hang up, and the like, on the call 110, leaving the first PSAP 112-1 connected to second communication device 106 (e.g., via the application server 111). Alternatively, the user 108 may hang up, and the like, on the call 110, leaving the first PSAP 112-1 connected to the first communication device 102 (e.g., via the application server 111).

Figure 8:
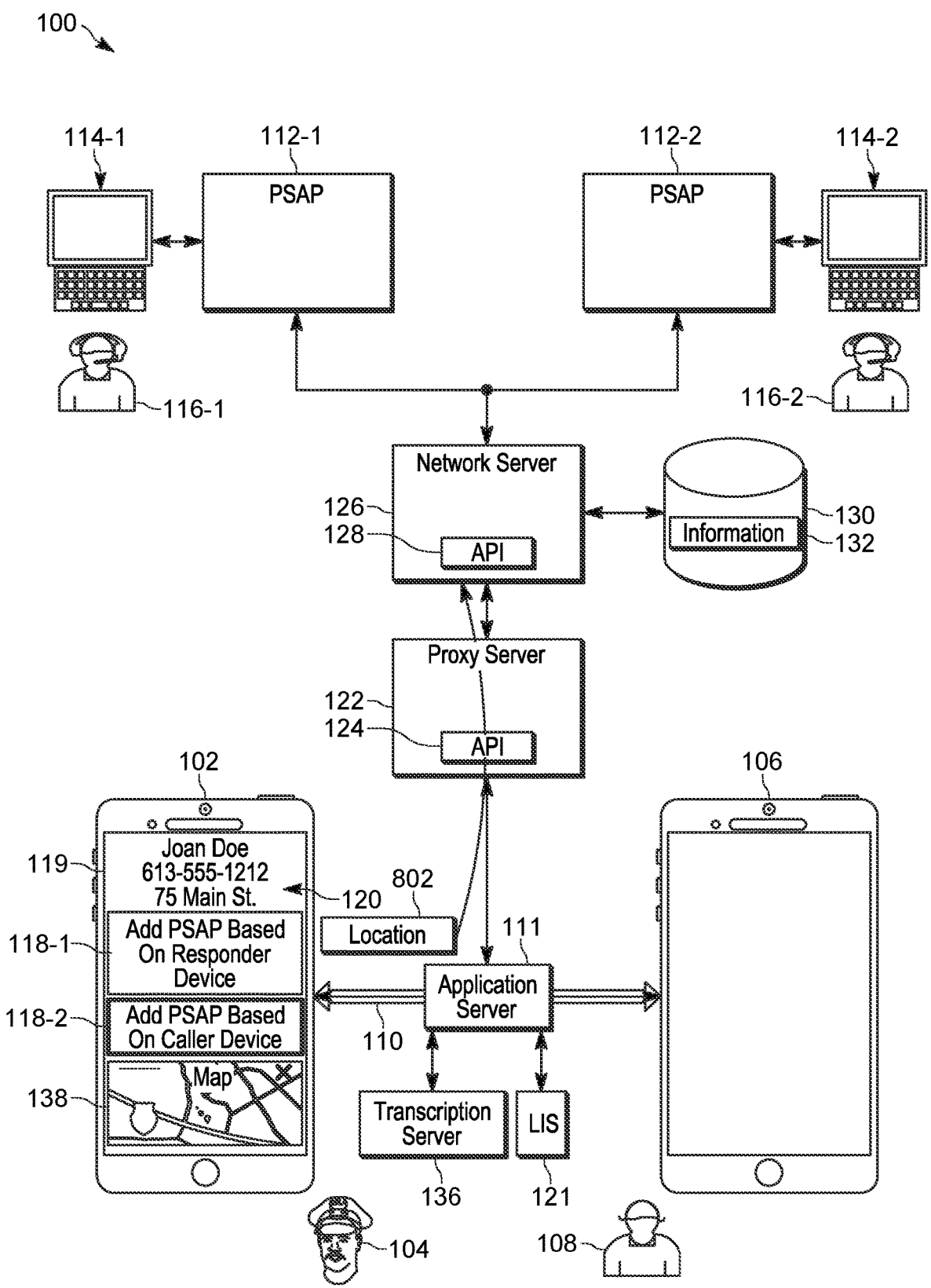
FIG. 8 depicts the system of FIG. 1, with the input mechanisms to select a public-safety answering point to add to the call, provided at the first communication device, with a second input mechanism being activated to select a public-safety answering point based on a location of the second communication device, according to some examples.
Figure 9:
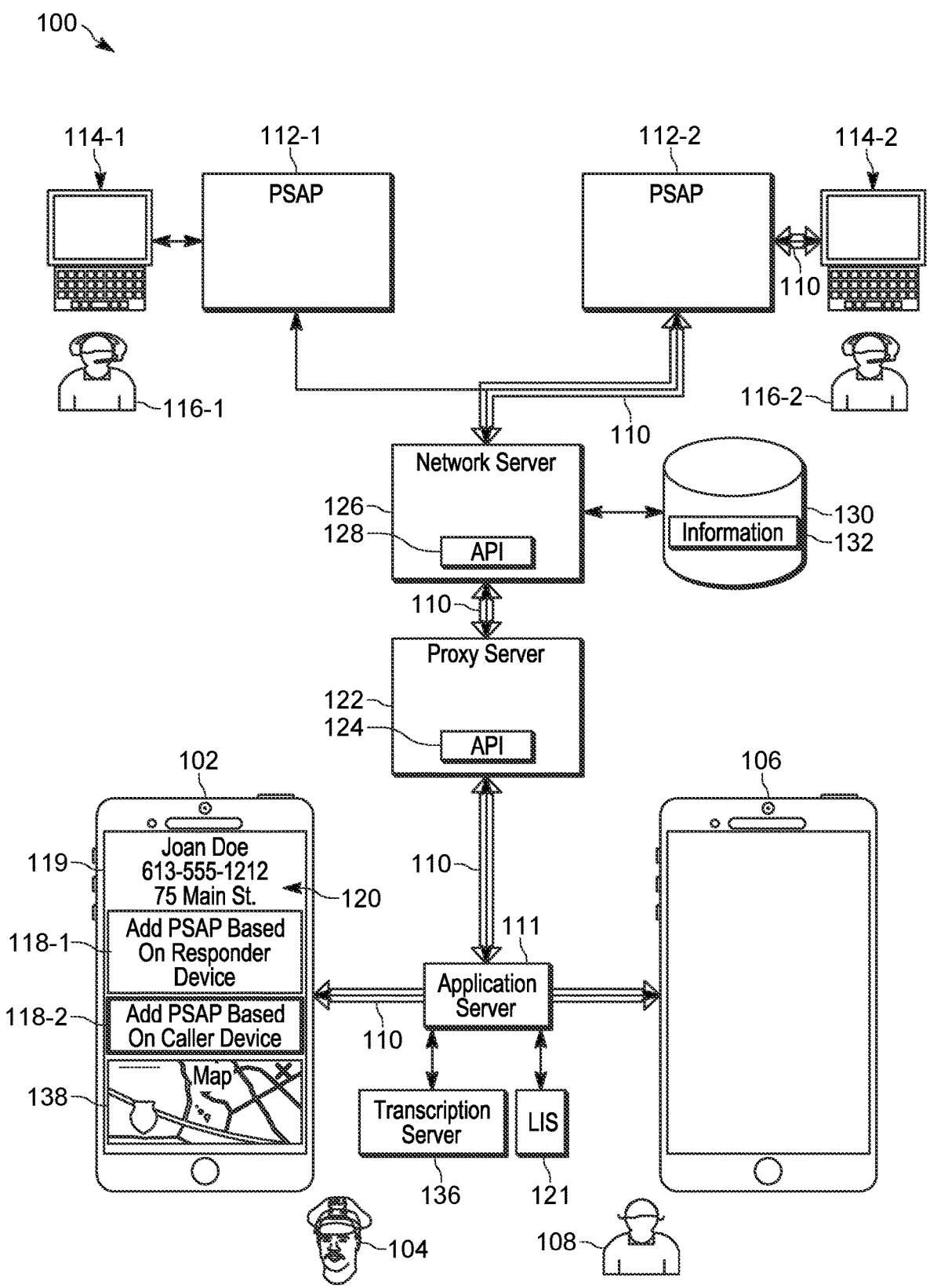
FIG. 9 depicts the system of FIG. 1, with the location of the second communication device being provided to the network server, which selects, and adds to the call, a public-safety answering point associated with the location of the second communication device, according to some examples.

Attention is next directed to FIG. 8 and FIG. 9 which depicts an example in which the second input mechanism 118-2 is selected, rather than the first input mechanism 118-1. Hence, the example in FIG. 8 and FIG. 9 may be implemented in place of the example of FIG. 6 and FIG. 7. Hence, it is understood that the example in FIG. 8 and FIG. 9 may follow, in time, the example of FIG. 5.

In particular, in FIG. 8, the first communication device 102 has detected (e.g., at the block 306 of the method 300) that the second input mechanism 118-2 has been activated, as indicated by the second input mechanism 118-2 being depicted with a heavier line than the first input mechanism 118-1.

As such, in FIG. 8, the first communication device 102 provides (e.g., at the block 310 of the method 300) the location 802 of the second communication device 106 (e.g., as received at the field 402 and/or in any other suitable manner) to the network server 126, for example via the proxy server 122 and the application server 111. Put another way, the first communication device 102 may transmit the location 802 to the proxy server 122, via the application server 111, which then transmits the location 802 to the network server 126.

In response to receiving the location 802, it is understood that the network server 126 may compare the location 802 to the information 132, and select the second PSAP 112-2 to be added to the call 110, as has previously been described.

Hence, attention is next directed to FIG. 9 in which it is understood that the network server 126 has selected the second PSAP 112-2 to be added to the call 110 and further has controlled call handling components in communication networks between the communication devices 102, 106 (e.g., via the application server 111), the proxy server 122 and/or the PSAPs 112 to connect the second PSAP 112-2 to the call 110. In particular, in FIG. 9, the second PSAP terminal 114-2 is connected to the call 110 via the second PSAP 112-2, the network server 126 and the proxy server 122 (e.g., via the application server 111). As such, in FIG. 9, the first communication device 102 communicates (e.g., at the block 312 of the method 300) on the call 110 with the second communication device 106 and the second PSAP 112-2 as selected by the network server 126. As such, the second call-taker 116-2 may talk on the call 110 with the first responder 104 and the user 108. In some examples, the first responder 104 may hang up, and the like, on the call 110, leaving the second PSAP 112-2 connected to second communication device 106. Alternatively, the user 108 may hang up, and the like, on the call 110, leaving the second PSAP 112-2 connected to the first communication device 102.

While not depicted in FIG. 6, FIG. 7, FIG. 8 and FIG. 9, as already described, the first communication device 102 may provide, to a selected PSAP 112, any suitable additional information, files, locations of the communication devices 102, 106, and the like, for example as metadata on the call 110 and/or separate from the call 110 via respective communication links therebetween.

Yet further features are within the scope of the present specification. For example, once the call 110 is connected to a selected PSAP 112, and to an associated PSAP terminal 114, a call-taker 116 operating the PSAP terminal 114 may cause the second communication device 106 to be muted such that the call-taker 116 may talk to the first responder 106 without being overheard by the user 108. Similarly, a call-taker 116 operating the PSAP terminal 114 may cause the first communication device 102 to be muted such that the call-taker 116 may talk to the user 108 without being overheard by the first responder 106.

In yet a further example, while the call 110 is being connected to a selected PSAP 112, and/or to an associated PSAP terminal 114, the first responder 106 may operate the first communication device 102 to leave the call 110 (e.g., prior to connection to a PSAP terminal 114).

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, control call handling equipment, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method comprising:
receiving, at a first communication device associated with a first responder, during a call with a second communication device, input to include a public-safety answering point (PSAP) on the call, the PSAP to be selected by a network server;
responsive to receiving the input, providing, at the first communication device:
a first input mechanism to select the PSAP based on an association with the first communication device; and
a second input mechanism to select the PSAP based on a location of the second communication device;
in response to detecting activation of the first input mechanism providing, from the first communication device to the network server: information to identify the association with the first communication device;
in response to detecting activation of the second input mechanism, providing, from the first communication device to the network server: the location of the second communication device; and, subsequently,
communicating on the call, at the first communication device, with the second communication device and the PSAP as selected by the network server.

2. The method of claim 1, wherein the information to identify the association with the first communication device comprises one or more of:
a respective location of the first communications device;
an identifier of a given PSAP associated with one or more of the first communication device or an agency associated with the first communications device; or
a respective identifier of one or more of the first communication device or the agency.

3. The method of claim 1, further comprising:
determining the location of the second communication device.

4. The method of claim 1, further comprising determining the location of the second communication device by one or more of:
receiving the location from the second communication device;
receiving the location from the second communication device via a text message;
receiving the location via an input device of the first communication device; or
receiving the location from a location information server.

5. The method of claim 1, wherein communication with the network server, by the first communication device, occurs via one or more of:
a proxy server; or
an Application Programming Interface (API) to one or more of the proxy server or the network server.

6. The method of claim 1, further comprising:
providing, at the first communication device, an initial input mechanism to receive the input to include the PSAP on the call.

7. The method of claim 1, wherein the first input mechanism and the second input mechanism are provided at a communication application rendered at a display screen of the first communication device.

8. The method of claim 7, wherein the input to include the PSAP on the call is received at the communication application.

9. The method of claim 1, further comprising providing, to the PSAP selected by the network server, one or more of:
the location of the second communication device;
a phone number of the second communication device;
a transcript of the call; or
files available to the first communication device.

10. The method of claim 1, wherein communicating with the second communication device and the PSAP as selected by the network server comprises the call being conferenced with the PSAP as controlled by the network server.

11. A communication device associated with a first responder, the communication device comprising:
a communication unit; and
a controller configured to:
receive, during a call with a second communication device, input to include a public-safety answering point (PSAP) on the call, the PSAP to be selected by a network server;
responsive to receiving the input, provide:
a first input mechanism to select the PSAP based on an association with the communication device; and
a second input mechanism to select the PSAP based on a location of the second communication device;
in response to detecting activation of the first input mechanism provide, via the communication unit, from the controller to the network server: information to identify the association with the communication device;
in response to detecting activation of the second input mechanism, provide, via the communication unit, from the controller to the network server:
the location of the second communication device; and, subsequently, communicate on the call, via the communication unit, with the second communication device and the PSAP as selected by the network server.

12. The communication device of claim 11, wherein the information to identify the association with the communication device comprises one or more of:
a respective location of the communications device;
an identifier of a given PSAP associated with one or more of the communication device or an agency associated with the communications device; or
a respective identifier of one or more of the communication device or the agency.

13. The communication device of claim 11, wherein the controller is further configured to:
determine the location of the second communication device.

14. The communication device of claim 11, wherein the controller is further configured to determine the location of the second communication device by one or more of:
receiving the location from the second communication device;
receiving the location from the second communication device via a text message;
receiving the location via an input device of the communication device; or
receiving the location from a location information server.

15. The communication device of claim 11, wherein communication with the network server occurs via one or more of:
a proxy server; or
an Application Programming Interface (API) to one or more of the proxy server or the network server.

16. The communication device of claim 11, wherein the controller is further configured to:
provide an initial input mechanism to receive the input to include the PSAP on the call.

17. The communication device of claim 11, further comprising a display screen, and wherein the first input mechanism and the second input mechanism are provided at a communication application rendered at the display screen.

18. The communication device of claim 17, wherein the input to include the PSAP on the call is received at the communication application.

19. The communication device of claim 11, wherein the controller is further configured to provide, to the PSAP selected by the network server, one or more of:
- the location of the second communication device;
- a phone number of the second communication device;
- a transcript of the call; or
- available files.

20. The communication device of claim 11, wherein communicating with the second communication device and the PSAP as selected by the network server comprises the call being conferenced with the PSAP as controlled by the network server.

* * * * *